United States Patent
Hsieh

(10) Patent No.: US 8,825,105 B2
(45) Date of Patent: Sep. 2, 2014

(54) MOBILE DEVICE, METHOD AND MACHINE-READABLE STORAGE MEDIUM FOR ADJUSTING RADIO POWER

(75) Inventor: Cheng-Ying Hsieh, New Taipei (TW)

(73) Assignee: Wistron Corp., New Taipei (TW)

( * ) Notice: Subject to any disclaimer, the term of this patent is extended or adjusted under 35 U.S.C. 154(b) by 330 days.

(21) Appl. No.: 13/293,350

(22) Filed: Nov. 10, 2011

(65) Prior Publication Data

US 2012/0295655 A1 Nov. 22, 2012

(30) Foreign Application Priority Data

May 20, 2011 (TW) .............................. 100117713 A

(51) Int. Cl.
*H04B 7/00* (2006.01)
*H04W 52/28* (2009.01)
*H04W 52/14* (2009.01)
*H04W 52/26* (2009.01)

(52) U.S. Cl.
CPC .......... *H04W 52/283* (2013.01); *H04W 52/146* (2013.01); *H04W 52/265* (2013.01)
USPC ............ 455/522; 455/566; 455/550; 455/556

(58) Field of Classification Search
CPC ............ H04W 52/146; H04W 52/265; H04W 52/283
See application file for complete search history.

(56) References Cited

U.S. PATENT DOCUMENTS

| | | | |
|---|---|---|---|
| 5,056,109 A * | 10/1991 | Gilhousen et al. | 370/342 |
| 6,456,856 B1 | 9/2002 | Werling et al. | |
| 8,432,322 B2 | 4/2013 | Amm et al. | |
| 2005/0239489 A1 | 10/2005 | Qian et al. | |
| 2006/0215559 A1 * | 9/2006 | Mese et al. | 370/232 |
| 2009/0298502 A1 * | 12/2009 | Hagerman et al. | 455/436 |
| 2009/0305742 A1 | 12/2009 | Caballero et al. | |
| 2012/0258772 A1 * | 10/2012 | Brogle et al. | 455/556.1 |
| 2013/0045697 A1 | 2/2013 | Cheng | |
| 2013/0115900 A1 | 5/2013 | Zhu | |

FOREIGN PATENT DOCUMENTS

| | | |
|---|---|---|
| CN | 1250234 | 4/2000 |
| CN | 101883413 | 11/2010 |
| CN | 101895977 | 11/2010 |
| CN | 101958455 | 1/2011 |
| WO | WO 2009/149023 | 12/2009 |

OTHER PUBLICATIONS

TW Office Action dated May 16, 2014.
English translation of TW Office Action dated May 16, 2014.
Chinese language office action dated Jun. 4, 2014.
English language translation of relevant paragraphs of Chinese office action.

* cited by examiner

*Primary Examiner* — Fayyaz Alam
*Assistant Examiner* — Mohammed Rachedine
(74) *Attorney, Agent, or Firm* — McClure, Qualey & Rodack, LLP

(57) ABSTRACT

A mobile device camping on a radio access network is provided. The mobile device includes an antenna, a radio frequency module, a detector and a processor. The RF module transmits a data packet to the radio access network via the antenna according to a radio power. The detector detects a distance between the mobile device and a user, and generates a detection signal according to the distance between the mobile device and the user. The processor controls the antenna and the RF module to transmit a first power level of the radio power to the radio access network according to the detection signal, so as to obtain a second power level from the radio access network, wherein the processor adjusts the radio power according to the second power level.

18 Claims, 4 Drawing Sheets

MOBILE DEVICE, METHOD AND MACHINE-READABLE STORAGE MEDIUM FOR ADJUSTING RADIO POWER

CROSS REFERENCE TO RELATED APPLICATIONS

This Application claims priority of Taiwan Patent Application No. 100117713, filed on May 20, 2011, the entirety of which is incorporated by reference herein.

BACKGROUND OF THE INVENTION

1. Field of the Invention

The invention relates to a mobile device, and more particularly to a mobile device which is able to detect a distance between a user and the mobile device, to adjust radio power thereof, so as to decrease specific absorption rate (SAR).

2. Description of the Related Art

With development of wireless communications technology, mobile devices are popular. For the $3^{rd}$ generation mobile telecommunications (3G) technology, a Wideband Code Division Multiple Access (W-CDMA) system can provide circuit switched (CS) services and packet switched (PS) services to respectively process the transmitting/receiving of audio and data, such that applications of the mobile devices can be more diversified. However, according to recent research related to mobile devices, electromagnetic waves radiating from mobile devices (e.g. mobile phone) in use may have some negative effects for users. In general, mobile devices having external antennas will radiate more electromagnetic waves than those having built-in antennas.

Therefore, many countries have regulations for an electromagnetic specific absorption rate (SAR) value of a mobile device for human bodies, wherein SAR is a measure of the rate at which radio frequency (RF) energy is absorbed by a human body when exposed to an RF electromagnetic field. It is defined as the power absorbed per mass of tissue and has units of Watts per kilogram. For example, the maximum SAR value is 1.6 W/kg in average for Federal Communications Commission (FCC) regulations in the U.S.A.

Nowadays, mobile devices are used so popularly and decreasing the SAR for human bodies due to the mobile devices has become an important issue when designing the mobile devices. Usually, by increasing the size of circuit board or decreasing the radio power, the SAR of a mobile device is decreased. However, increasing the size of circuit board is contrary to the trend for miniaturization. Furthermore, decreasing the radio power decays signals transmitted by the antenna. Similarly, using a microwave absorbing material to change the electric field intensity distribution of a mobile device, also decays the signal transmitted by the antenna. Additionally, cost of the microwave absorbing material is high, thus increasing the cost of mobile devices.

BRIEF SUMMARY OF THE INVENTION

Mobile devices, methods and machine-readable storage medium for adjusting radio power are provided. An embodiment of a mobile device camping on a radio access network is provided. The mobile device comprises: an antenna; a radio frequency (RF) module, transmitting a data packet to the radio access network via the antenna according to a radio power; a detector, detecting a distance between the mobile device and a user, and generating a detection signal according to the distance between the mobile device and the user; and a processor, controlling the antenna and the RF module to transmit a first power level of the radio power to the radio access network according to the detection signal, so as to obtain a second power level from the radio access network, wherein the processor adjusts the radio power according to the second power level.

Furthermore, a method for adjusting radio power of a mobile device camping on a radio access network is provided, wherein the mobile device transmits a data packet to the radio access network according to a radio power. A distance between the mobile device and a user is detected to determine whether the user is located at a predetermined distance from the mobile device. A first power level of the radio power of the mobile device is transmitted to the radio access network when it is determined that the user is located at the predetermined distance from the mobile device, so as to receive a second power level from the radio access network. The radio power of the mobile device is adjusted according to the second power level.

Moreover, a machine-readable storage medium comprising a computer program is provided, which, when executed, causes a device to perform a method for adjusting radio power of a mobile device camping on a radio access network. A distance between the mobile device and a user is detected to determine whether the user is located at a predetermined distance from the mobile device. A first power level of the radio power of the mobile device is transmitted to the radio access network when it is determined that the user is located at the predetermined distance from the mobile device, so as to receive a second power level from the radio access network. The radio power of the mobile device is adjusted according to the second power level.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
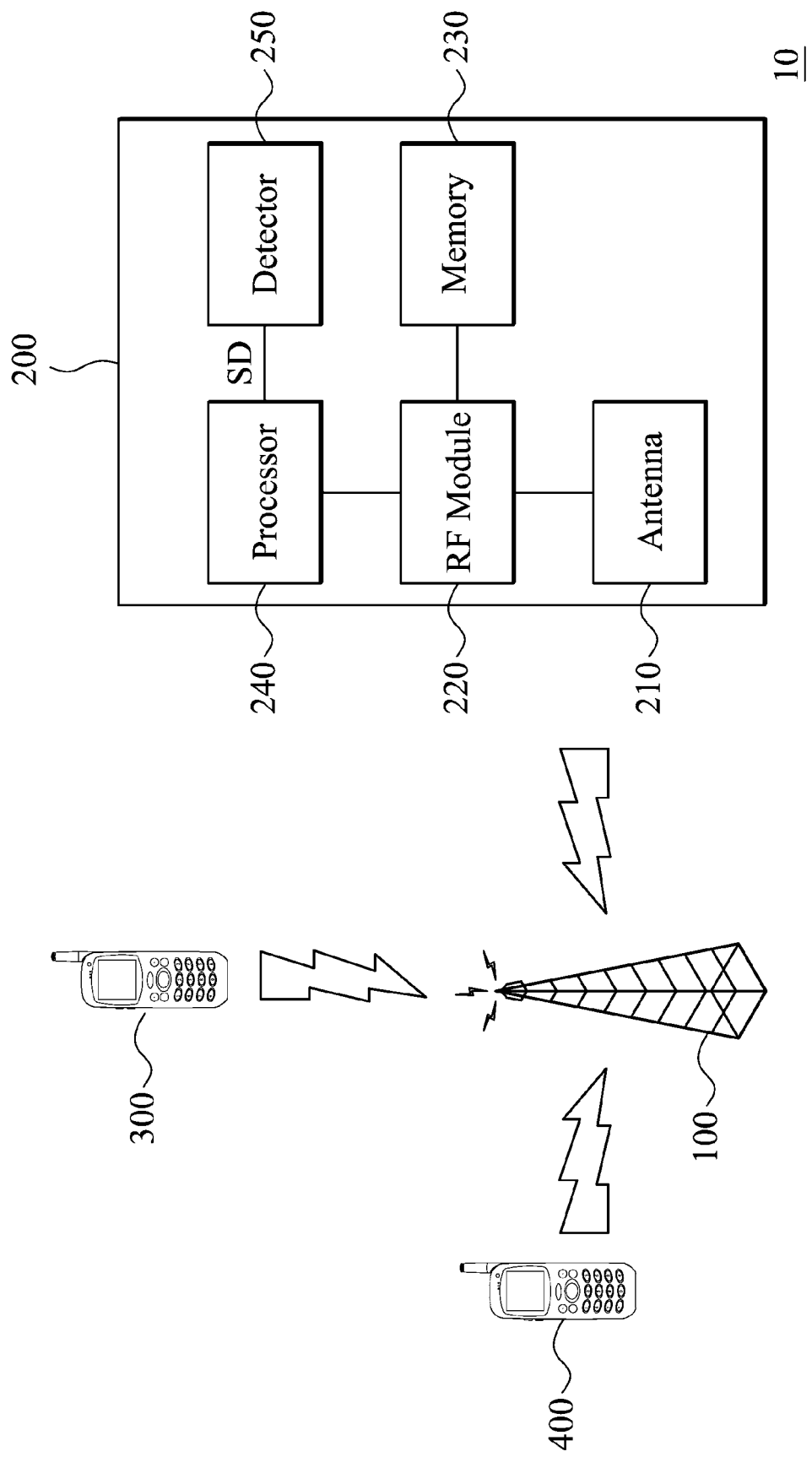
FIG. 1 shows a communications system according to an embodiment of the invention.

FIG. 1 shows a communications system 10 according to an embodiment of the invention. In the communications system 10, after camping on a cell 100 of a universal mobile telecommunications system terrestrial radio access network (UTRAN), a mobile device (may be called User Equipment (UE) interchangeably) 200 may access a core network such as Wideband Code Division Multiple Access (WCDMA) and the like for transferring data packets, wherein the cell 100 may be a base station, a node-B or others. The mobile device 200 comprises an antenna 210, a radio frequency (RF) module 220, a memory 230, a processor 240 and a detector 250. The processor 240 controls the communications between the mobile station 200 and the cell 100 via the RF module 220 and the antenna 210. According to a radio power, the RF module 220 transmits data or audio to the cell 100 via the antenna 210. In the embodiment, the mobile device 200 is a wireless data modem, which performs data transmission with the cell 100. In addition, the detector 250 may be implemented at any side of the mobile device 200, which is used to detect whether a user is located at a predetermined distance from the mobile device 200. In one embodiment, the detector 250 comprises any type of sensor, such as a light sensor, a temperature sensor, an acceleration sensor, or an infrared sensor etc.).

Figure 2:
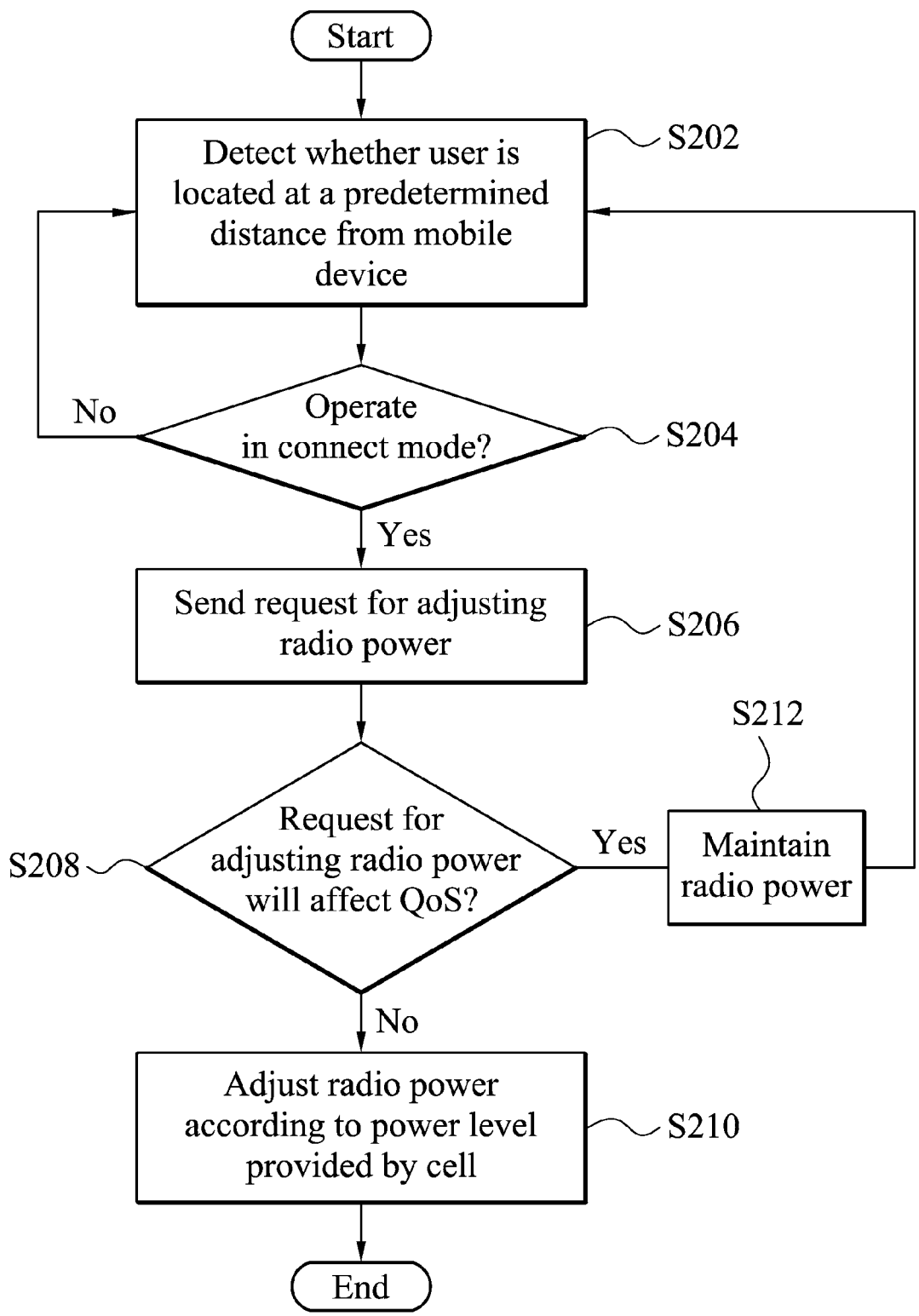
FIG. 2 shows a method for adjusting radio power of a mobile device which camps on a UTRAN according to an embodiment of the invention.

FIG. 2 shows a method for adjusting radio power of a mobile device which camps on a UTRAN according to an embodiment of the invention. Referring to FIG. 1 and FIG. 2 together, First, in step S202, the detector 250 generates a detection signal SD to the processor 240 when detecting that the user is located at a predetermined distance from the mobile device 200, such as it is detected that a distance between the mobile device 200 and the user is smaller than or equal to the predetermined distance. Next, after receiving the detection signal SD, the processor 240 further determines an operating mode of the mobile device 200 (step S204), i.e. an idle mode or a connect mode. If the mobile device 200 is operating in an idle mode, the processor 240 ignores the detection signal SD, and the detector 250 continues detecting whether the user is located at the predetermined distance from the mobile device 200. On the contrary, if the mobile device 200 is operating in a connect mode, the processor 240 controls the RF module 220 to transmit a message comprising a power level P1 of the current radio power to the cell 100 for making a request to the cell 100 to decrease the radio power of the mobile device 200 (step S206). The power level P1 is stored in the memory 230 and the memory 230 is a nonvolatile memory. Next, after receiving the request for an adjustment in the radio power of the mobile device 200, the cell 100 determines whether to grant the adjustment request according to system capacity of the UTRAN and usage status of radio resource (step S208). For example, when receiving the request for decreasing the radio power, the cell 100 provides a suitable power level P2 to the mobile device 200 according to the quality of Service (QoS) of the mobile device 200. The QoS is a mechanism for controlling the performance, reliability and usability of a telecommunications service, wherein coverage, accessibility and audio quality will affect the QoS of a mobile device. Therefore, with no effect on the QoS of the mobile device 200, the cell 100 transmits a message comprising a lower power level P2 (i.e. P2<P1) to the mobile device 200. Consequently, in a connect mode, the mobile device 200 may decrease the radio power of the RF module 220 according to the power level P2 suggested by the cell 100 when the user is located at the predetermined distance from the mobile device 200 (step S210). Thus, SAR is decreased. Furthermore, the power level P2 is also stored in the memory 230. On the contrary, in step S212, the cell 100 rejects the adjustment request and notifies the mobile device 200 to maintain the original radio power when the request for decreasing the radio power will degrade the QoS of the mobile device 200 (e.g. interfering with radios of the air). For example, if the QoS of the mobile device 200 is smaller than a specific value, the adjustment request will degrade the QoS of the mobile device 200.

On the other hand, the detector 250 is also used to detect whether the user is out of the predetermined distance from the mobile device. The detector 250 generates the detection signal SD and provides it to the processor 240 when detecting that the user is not located at the predetermined distance from the mobile device 200 (step S202), such as it is detected that the distance between the mobile device 200 and the user is larger than the predetermined distance. Similarly, after receiving the detection signal SD, the processor 240 further determines an operating mode of the mobile device 200 (step S204). If the mobile device 200 is operating in an idle mode, the processor 240 ignores the detection signal SD, and the detector 250 continues detecting whether the user is located at the predetermined distance from the mobile device 200. On the contrary, if the mobile device 200 is operating in a connect mode, the processor 240 controls the RF module 220 to transmit a message comprising a power level P3 of the current radio power to the cell 100 for making a request to the cell 100 to increase the radio power of the mobile device 200 (step S206). The power level P3 is stored in the memory 230. In one embodiment, the power level P3 is equal to the power level P2 described above, wherein the power level P2 is a suggestion value provided by the cell 100 when the user is located in the predetermined distance from the mobile device 200. Similarly, after receiving the request for an adjustment in the radio power of the mobile device 200, the cell 100 determines whether to grant the adjustment request according to system capacity of the UTRAN and usage status of radio resource (step S208). For example, when receiving the request for increasing the radio power, the cell 100 provides a suitable power level P4 to the mobile device 200 according to QoS of all mobile devices camping on the cell 100, such as the mobile devices 200, 300 an 400 of FIG. 1. Therefore, with no effect on the QoS of the all mobile devices, the cell 100 transmits a message comprising a higher power level P4 (i.e. P4>P3) to the mobile device 200. Consequently, in a connect mode, the mobile device 200 may increase the radio power of the RF module 220 according to the power level P4 suggested by the cell 100 when the user is not located at the predetermined distance from the mobile device 200 (step S210), i.e. the user leaves the mobile device. Furthermore, the power level P4 is also stored in the memory 230. On the contrary, in step S212, the cell 100 rejects the adjustment request and notifies the mobile device 200 to maintain the original radio power when the request for increasing the radio power will degrade the QoS of any mobile device camping on the cell 100. For example, if the QoS of any mobile device is smaller than a specific value, the adjustment request will degrade the QoS of the mobile device.

Figure 3:
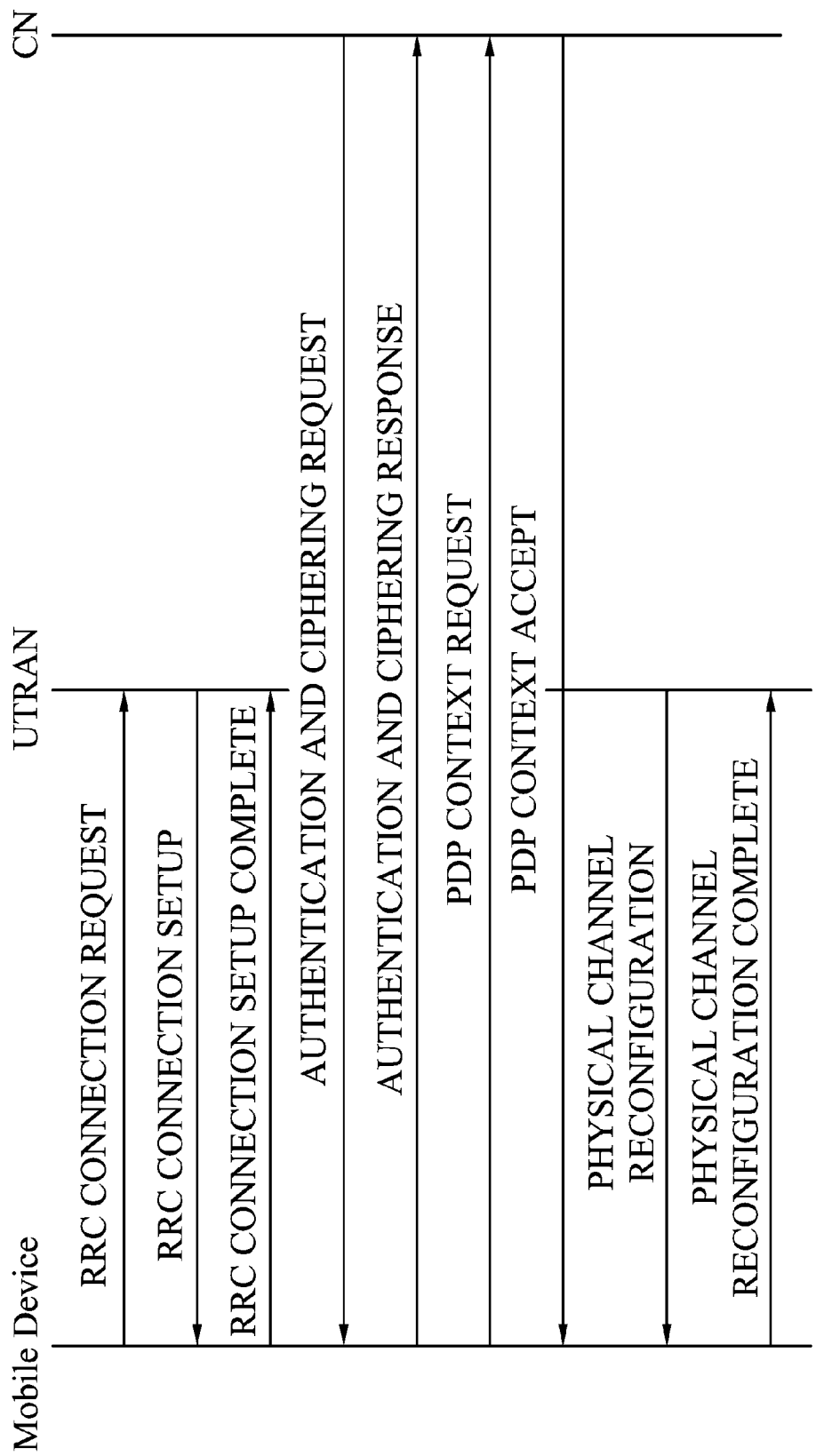
FIG. 3 shows a schematic illustrating the communication messages between a mobile device, a UTRAN and a core network according to a first embodiment of the invention.

FIG. 3 shows a schematic illustrating the communication messages between a mobile device, a UTRAN and a Core Network (CN) according to a first embodiment of the invention. In FIG. 3, when a detector of the mobile device detects that a user is located or not located at a predetermined distance from the mobile device, the mobile device requests for a radio power adjustment service by setting a Radio Resource Control (RRC) connect. First, the mobile device sends a RRC CONNECTION REQUEST message to the UTRAN, so as to request to establish a RRC connect and adjust a radio power of the mobile device, wherein the RRC CONNECTION REQUEST message comprises the current power level of the radio power of the mobile device. As described above, the mobile device sends a request for decreasing the radio power when it is detected that the user is located in the predetermined distance from the mobile device, and the mobile device sends a request for increasing the radio power when it is detected that the user is not located in the predetermined distance from the mobile device. Next, the UTRAN sends a RRC CONNECTION SETUP message to the mobile device.

The mobile device sends a RRC CONNECTION SETUP COMPLETE message to the UTRAN in response to the RRC CONNECTION SETUP message. Next, the core network sends an AUTHENTICATION AND CIPHERING REQUEST message to the mobile device, so as to perform a security setup for the mobile device. Next, the mobile device sends an AUTHENTICATION AND CIPHERING RESPONSE message to the core network for response. Next, after the security setup is completed, the mobile device sends a PACKET DATA PROTOCOL (PDP) CONTEXT REQUEST message to the core network, so as to request for a packet communications service. Next, the core network sends a PDP CONTEXT ACCEPT message to the mobile device. Next, the UTRAN sends a PHYSICAL CHANNEL RECONFIGURATION message to the mobile device according to system capacity of the UTRAN and usage status of radio resource, so as to notify the mobile device that the request for increasing or decreasing the radio power has or has not been granted and provides a suitable power level of the radio power to the mobile device. Next, the mobile device adjusts the radio power thereof according to the power level provided by the UTRAN. After the radio power adjustment is completed, the mobile device sends a PHYSICAL CHANNEL RECONFIGURATION COMPLETE message to the UTRAN.

Figure 4:
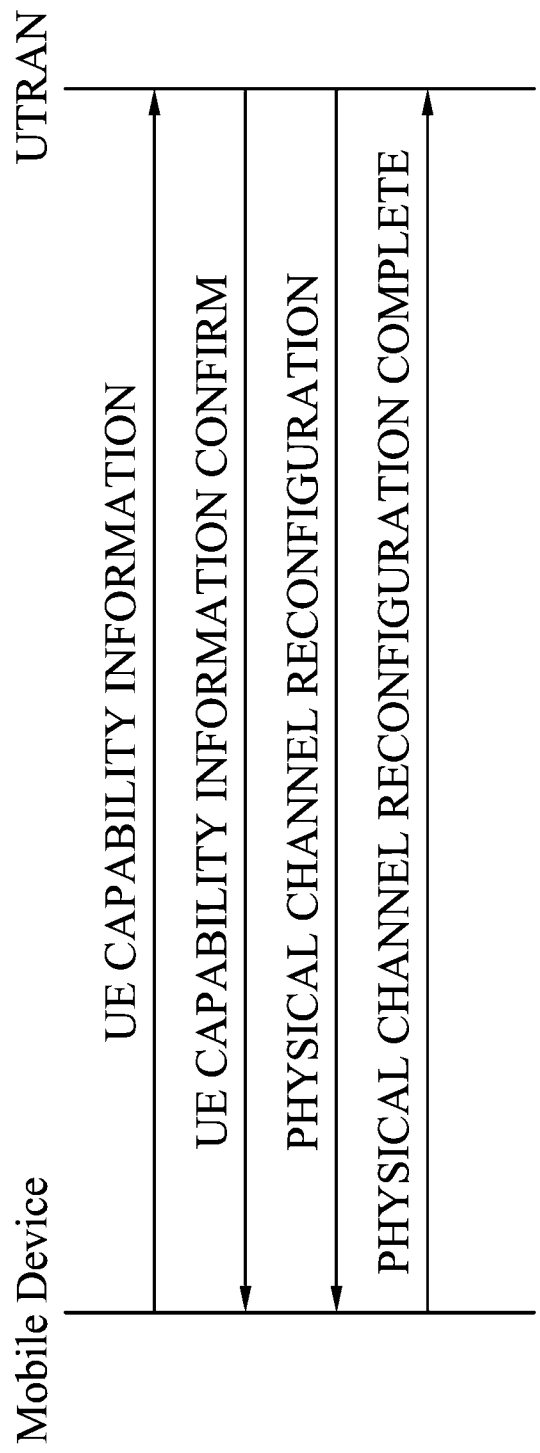
FIG. 4 shows a schematic illustrating the communication messages between a mobile device, a UTRAN and a core network according to a second embodiment of the invention.

FIG. 4 shows a schematic illustrating the communication messages between a mobile device, a UTRAN and a core network according to a second embodiment of the invention. In FIG. 4, a RRC connect is established between the mobile device and the UTRAN. When a detector of the mobile device detects that a user is located or is not located at a predetermined distance from the mobile device, the mobile device sends a UE CAPABILITY INFORMATION message to the UTRAN, so as to request to adjust a radio power of the mobile device, wherein the UE CAPABILITY INFORMATION message comprises the current power level of the radio power of the mobile device. As described above, the mobile device sends a request to the UTRAN to decrease the radio power when it is detected that the user is located in the predetermined distance from the mobile device, and the mobile device sends a request to the UTRAN to increase the radio power when it is detected that the user is not located in the predetermined distance from the mobile device. Next, the UTRAN sends a UE CAPABILITY INFORMATION CONFIRM message to the mobile device. Next, the UTRAN sends a PHYSICAL CHANNEL RECONFIGURATION message to the mobile device according to system capacity of the UTRAN and usage status of radio resource, so as to notify the mobile device that the request for increasing or decreasing the radio power has or has not been granted and provides a suitable power level of the radio power to the mobile device. Next, the mobile device adjusts the radio power thereof according to the power level provided by the UTRAN. After the radio power adjustment is completed, the mobile device sends a PHYSICAL CHANNEL RECONFIGURATION COMPLETE message to the UTRAN.

Data transmission methods, or certain aspects or portions thereof, may take the form of a program code (i.e., executable instructions) embodied in tangible media, such as floppy diskettes, CD-ROMs, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device camping on a radio access network, comprising:
   an antenna;
   a radio frequency (RF) module, communicating with the radio access network via the antenna according to a radio power;
   a detector, detecting a distance between the mobile device and a user, and generating a detection signal according to the distance between the mobile device and the user; and
   a processor, controlling the antenna and the RF module to transmit an power adjustment request to the radio access network according to the detection signal, wherein the power adjustment request comprises a first power level of the radio power,
   wherein the radio access network provides a second power level according to the first power level of the power adjustment request,
   wherein the processor adjusts the radio power to the second power level.

2. The mobile device as claimed in claim 1, wherein the second power level is smaller than the first power level when the detector detects that the user is located at a predetermined distance from the mobile device, and the second power level is larger than the first power level when the detector detects that the user is not located at the predetermined distance from the mobile device.

3. The mobile device as claimed in claim 1, wherein the radio access network provides the second power level according to the quality of service (QoS) of the mobile device.

4. The mobile device as claimed in claim 3, wherein the second power level is equal to the first power level when the detector detects that the user is located at a predetermined distance from the mobile device and the quality of service of the mobile device is smaller than a specific value.

5. The mobile device as claimed in claim 1, wherein the radio access network provides the second power level according to the power level of the radio power of the other mobile devices camping on the radio access network.

6. The mobile device as claimed in claim 5, wherein the second power level is equal to the first power level when the detector detects that the user is not located at a predetermined distance from the mobile device and the quality of service of any other mobile device camping on the radio access network is smaller than a specific value.

7. The mobile device as claimed in claim 1, wherein when detecting that the distance between the mobile device and the user is smaller than or equal to a predetermined distance, the detector provides the detection signal to the processor to indicate that the user is located at the predetermined distance from the mobile device, and when detecting that the distance between the mobile device and the user is larger than the predetermined distance, the detector provides the detection signal to the processor to indicate that the user is not located at the predetermined distance from the mobile device.

8. The mobile device as claimed in claim 1 further comprising
a memory for storing the first power level and the second power level.

9. The mobile device as claimed in claim 1, wherein the processor transmits the first power level to the radio access network via a RADIO RESOURCE CONTROL (RRC) REQUEST message or a USER EQUIPMENT (UE) CAPABILITY INFORMATION message, and the processor obtains the second power level according to a PHYSICAL CHANNEL RECONFIGURATION message from the radio access network.

10. A method for adjusting radio power of a mobile device camping on a radio access network, wherein the mobile device communicates with the radio access network according to a radio power, comprising:
detecting a distance between the mobile device and a user to determine whether the user is located at a predetermined distance from the mobile device;
transmitting an power adjustment request to the radio access network when it is determined that the user is located at the predetermined distance from the mobile device, wherein the power adjustment request comprises a first power level of the radio power;
obtaining a second power level from the radio access network, wherein the radio access network provides the second power level according to the first power level of the power adjustment request; and
adjusting the radio power of the mobile device to the second power level.

11. The method as claimed in claim 10, wherein the second power level is smaller than the first power level.

12. The method as claimed in claim 10, wherein the radio access network provides the second power level according to the quality of service (QoS) of the mobile device, and the second power level is equal to the first power level when the quality of service of the mobile device is smaller than a specific value.

13. The method as claimed in claim 10, wherein the mobile device transmits the first power level to the radio access network via a RADIO RESOURCE CONTROL (RRC) REQUEST message or a USER EQUIPMENT (UE) CAPABILITY INFORMATION message, and the mobile device obtains the second power level according to a PHYSICAL CHANNEL RECONFIGURATION message from the radio access network.

14. The method as claimed in claim 10, further comprising:
detecting the distance between the mobile device and the user after it is determined that the user is located at the predetermined distance from the mobile device;
transmitting a third power level of the radio power of the mobile device to the radio access network when it is determined that the user is not located at the predetermined distance from the mobile device, so as to receive a fourth power level from the radio access network; and
adjusting the radio power of the mobile device according to the fourth power level.

15. The method as claimed in claim 14, wherein the fourth power level is larger than the third power level.

16. The method as claimed in claim 14, wherein the radio access network provides the fourth power level according to the power level of the radio power of the other mobile devices camping on the radio access network, and the fourth power level is equal to the third power level when the quality of service of any other mobile device camping on the radio access network is smaller than a specific value.

17. A non-transitory machine-readable storage medium comprising a computer program, which, when executed, causes a device to perform a method for adjusting radio power of a mobile device camping on a radio access network, comprising:
detecting a distance between the mobile device and a user to determine whether the user is located at a predetermined distance from the mobile device;
transmitting an power adjustment request to the radio access network when it is determined that the user is located at the predetermined distance from the mobile device, wherein the power adjustment request comprises a first power level of the radio power;
obtaining a second power level from the radio access network, wherein the radio access network provides the second power level according to the first power level of the power adjustment request; and
adjusting the radio power of the mobile device to the second power level.

18. The machine-readable storage medium as claimed in claim 17, wherein the method further comprises:
detecting the distance between the mobile device and the user after it is determined that the user is located at the predetermined distance from the mobile device;
transmitting a third power level of the radio power of the mobile device to the radio access network when it is determined that the user is not located at the predetermined distance from the mobile device, so as to receive a fourth power level from the radio access network; and
adjusting the radio power of the mobile device according to the fourth power level.

* * * * *